United States Patent [19]

Schuster

[11] Patent Number: 4,532,184

[45] Date of Patent: Jul. 30, 1985

[54] PRECIOUS METAL VAPORIZATION REDUCTION

[75] Inventor: Gary B. A. Schuster, Newark, Ohio

[73] Assignee: Owens-Corning Fiberglas Corporation, Toledo, Ohio

[21] Appl. No.: 554,503

[22] Filed: Nov. 23, 1983

[51] Int. Cl.$^3$ .............................................. B32B 9/04
[52] U.S. Cl. .................................. 428/433; 65/374.11; 427/423; 428/450; 428/471; 428/472; 428/689; 428/702
[58] Field of Search ............... 428/472, 702, 471, 450, 428/689, 433, 699, 701; 427/423; 65/374.11

[56] References Cited

U.S. PATENT DOCUMENTS

| | | | |
|---|---|---|---|
| 3,436,511 | 4/1969 | Rath | 427/423 |
| 3,540,896 | 11/1970 | Flicker | 428/472 |
| 3,657,784 | 4/1972 | Selman et al. | 428/471 |
| 3,859,070 | 1/1975 | Slonaker | 428/472 |
| 4,313,975 | 2/1982 | Mairy | 427/423 |
| 4,382,811 | 5/1983 | Luscher et al. | 428/702 |
| 4,425,411 | 1/1984 | Textor et al. | 428/472 |

OTHER PUBLICATIONS

A. G. Knapton–"Ensuring the Most Advantageous Use of Platinum" Platinum Metals Rev. 1979 (23), pp. 2–13.

*Primary Examiner*—George F. Lesmes
*Assistant Examiner*—William M. Atkinson
*Attorney, Agent, or Firm*—Ronald C. Hudgens; Robert F. Rywalski; Debra L. Pawl

[57] ABSTRACT

Metal vaporization from precious metals is reduced by applying to the surface of the metal a flame sprayed coating comprising a refractory material and a glass.

8 Claims, No Drawings

PRECIOUS METAL VAPORIZATION REDUCTION

BACKGROUND OF THE INVENTION

This invention pertains to precious metal vaporization.

In one of its more specific aspects, this invention relates to laminar refractory structures comprising a vapor barrier in combination with a precious metal.

The use of precious metals and their alloys is well known. Such metals, ordinarily including platinum, iridium, rhodium and the like, can be used in their pure forms, in combination with each other, as their oxides or combinations thereof. By precious metals as employed herein, are meant all such combinations of platinum, iridium and rhodium, in whatever form they may be employed. Frequently, such metals are employed under conditions which cause the migration of the precious metals from the principal body of the metal, itself.

One particularly suitable method for reducing precious metal vaporization from glass fiber forming apparatus, comprising platinum, is described and claimed in U.S. Pat. No. 3,859,070 issued Jan. 7, 1985 to Robert O. Slonaker, incorporated herein by reference. That process is directed to depositing a high density refractory material selected from the group consisting of magnesia, magnesium zirconate, zirconia, alumina, titania, chromia, aluminide, silicide, beryllides, borides and combinations thereof on the surface from which metal vaporization is to be reduced.

In an article by A. G. Knapton in PT. MT. RV. 23 (1979), "Ensuring the Most Advantageous Use of Platinum", a plurality of methods of reducing metallic migration are discussed.

There has now been discovered, however, a method which is a decided improvement of the foregoing methods.

STATEMENT OF THE INVENTION

According to this invention, there is provided a method of reducing precious metal vaporization from precious metals and their alloys operating at elevated temperatures which comprises applying to the surface of the precious metal a combination comprising a first material having a liquidus temperature less than the temperature at which the precious metal is to operate and a second material having a liquidus temperature greater than the temperature at which the precious metal is to operate.

In one embodiment of this invention, the second material will comprise a refractory material not of the platinum group and the first material will comprise a glass.

Also, according to this invention, there is provided an apparatus comprising a precious metal, or an alloy of precious metals, having on its surface a mixture comprising a refractory material not of the platinum group and a glass.

DETAILED DESCRIPTION OF THE INVENTION

The precious metal to be protected can be in any suitable form including plates, slabs, bar and the like, as well as in the form of fabricated articles. In one of its more useful forms, the precious metal will be in the form of a bushing, with or without tips, adapted to hold a mass of molten glass from which glass fibers are withdrawn through apertures in a lower surface.

Any suitable refractory material not of the platinum group can be employed. Preferably, the refractory material will comprise MgO, $ZrO_2$, $Al_2O_3$, $TiO_2$, $Cr_2O_3$, and combinations thereof, or other suitable materials including aluminides, silicides, borides, and combinations thereof.

Preferably, the glass will be a high silica, alumina, and calcium oxide containing glass with minor amounts of the oxides of titanium, iron, and sodium. In the preferred embodiment of the invention, the glass will be of the following approximate composition:

| | | | | | |
|---|---|---|---|---|---|
| $SiO_2$ | 59.82 | MgO | 0.15 | $SO_3$ | 0.01 |
| $Fe_2O_3$ | 0.24 | $Na_2O$ | 0.56 | $Cr_2O_3$ | 0.01 |
| $TiO_2$ | 0.57 | $K_2O$ | 0.10 | $F_2$ | 0.07 |
| $Al_2O_3$ | 14.80 | $B_2O_3$ | 0.12 | FeO | 0.17 |
| CaO | 23.55 | | | | |

Any suitable quantity of glass sufficient to decrease metal vaporization can be combined with the refractory material. In the preferred embodiment of the invention, the glass will comprise up to about 35 volume percent of the total volume of the mixture comprising the refractory and the glass. In the most preferred embodiment of the invention, the glass will comprise about 20 volume percent of the mixture. The mixture can be formed in any suitable manner by which a substantially uniform composite is formed.

While this broad range of components can be used to form the protective coating, it is desirable that one component have a liquidus temperature slightly below the temperature at which the protected part is to operate and one component have a liquidus temperature greater than that operating temperature.

The mixture is applied to the surface of the metal by any suitable method, preferably by standard flame spraying techniques, to a thickness within the range of from about 0.003 to about 0.005 in. The metal can be preheated to a red glow, the mixture applied to the desired thickness and the coated metal cooled thereafter in air. Suitable aftercoats of serviceable paints can be applied thereafter.

The dual phase coating was tested on platinum-robidium coupons to determine its effectiveness in reducing weight loss due to volatilization. Each coupon had a surface area of 8 square inches. The coupons were suspended in a furnace for 40 days at 2300° F. The results of the tests were as follows:

| Coating | # of Coupons Tested | Average Wt. Loss (mg) |
|---|---|---|
| Dual phase of Invention | 8 | 43.8 |
| Magnesium-Zirconate | 4 | 115.1 |
| Unprotected | 4 | 88.7 |

While there was considerable scatter in the results and the test conditions did not accurately simulate bushing operating conditions, the results do indicate that the dual phase coating of the invention under the test conditions did reduce alloy loss in an amount greater than 50%.

It will be evident from the foregoing that various modifications can be made to this invention. Such, however, are considered within the scope of the invention.

I claim:

1. A bushing adapted to hold a mass of molten glass from which glass fibers are withdrawn, comprising a precious metal selected from the group consisting of platinum, iridium, rhodium and a combination thereof, having on its surface a flame sprayed coating comprising:
   (a) a refractory material selected from the group consisting of MgO, ZrO$_2$, Al$_2$O$_3$, TiO$_2$, Cr$_2$O$_3$, aluminides, silicides, borides and a combination thereof; and
   (b) a calcia-aluminosilicate glass, said glass being present in an amount effective to decrease the vaporization of said precious metal.

2. The precious metal of claim 1 in which said glass has the following approximate composition:

| SiO$_2$ | 59.82 | MgO | 0.15 | SO$_3$ | 0.01 |
| Fe$_2$O$_3$ | 0.24 | Na$_2$O | 0.56 | Cr$_2$O$_3$ | 0.01 |
| TiO$_2$ | 0.57 | K$_2$O | 0.10 | K$_2$ | 0.07 |
| Al$_2$O$_3$ | 14.80 | B$_2$O$_3$ | 0.12 | FeO | 0.17 |
| CaO | 23.55 | | | | |

3. The precious metal of claim 1 in which said coating comprises up to about 35 volume percent glass.

4. The precious metal of claim 1 in which said coating comprises about 20 volume percent glass.

5. A method of reducing precious metal vaporization from precious metals which comprises applying to the surface of a precious metal selected from the group consisting of platinum, iridium, rhodium and combinations thereof, a coating comprising:
   (a) a refractory material selected from the group consisting of MgO, ZrO$_2$, Al$_2$O$_3$, TiO$_2$, Cr$_2$O$_3$, aluminides, silicides, borides, and combinations thereof; and
   (b) a calcia-aluminosilicate glass, wherein said glass is present in an amount effective to decrease the vaporization of said precious metal.

6. The method of claim 1 in which said glass has the following approximate composition:

| SiO$_2$ | 59.82 | MgO | 0.15 | SO$_3$ | 0.01 |
| Fe$_2$O$_3$ | 0.24 | Na$_2$O | 0.56 | Cr$_2$O$_3$ | 0.01 |
| TiO$_2$ | 0.57 | K$_2$O | 0.10 | K$_2$ | 0.07 |
| Al$_2$O$_3$ | 14.80 | B$_2$O$_3$ | 0.12 | FeO | 0.17 |
| CaO | 23.55 | | | | |

7. The method of claim 1 in which said coating comprises up to about 35 volume percent glass.

8. The method of claim 1 in which said coating comprises about 20 volume percent glass.

* * * * *